United States Patent [19]

Yamagata et al.

[11] Patent Number: 4,472,103
[45] Date of Patent: Sep. 18, 1984

[54] MULTISTAGE HYDRAULIC MACHINES AND METHODS OF CONTROLLING OPERATIONS THEREOF

[75] Inventors: Ichiro Yamagata; Sachio Tsunoda, both of Yokohama, Japan

[73] Assignee: Tokyo Shibaura Denki Kabushiki Kaisha, Kawasaki, Japan

[21] Appl. No.: 387,368

[22] Filed: Jun. 11, 1982

[51] Int. Cl.³ .............................................. F01D 17/00
[52] U.S. Cl. ...................................... 415/1; 415/500; 415/29
[58] Field of Search ...................... 415/29, 500, 1, 50, 415/15, 16, 17, 20

[56] References Cited

U.S. PATENT DOCUMENTS 3,007,628 11/1961 Nichols .............................. 415/500
4,255,078 3/1981 Tsunoda ................................ 415/1
4,280,788 7/1981 Tsunoda ................................ 415/1

FOREIGN PATENT DOCUMENTS 2630642 3/1977 Fed. Rep. of Germany ...... 415/500
2922254 12/1979 Fed. Rep. of Germany ...... 415/500
142436 11/1979 Japan ................................... 415/500
34965 4/1981 Japan ................................... 415/500

Primary Examiner—Stephen Marcus
Assistant Examiner—Brian J. Bowman
Attorney, Agent, or Firm—Stevens, Davis, Miller & Mosher

[57] ABSTRACT

A multistage hydraulic machine such as a pump/turbine having at least three pressure stages in which the highest and lowest pressure stages are provided with movable guide vanes the degree of opening of which are variable, and the other intermediate pressure stages are provided with stationary guide vanes the degree of opening of which are not variable. The movable and stationary guide vanes are simultaneously or independently controlled in accordance with a change of an operational condition at the time of steady operation in a manner such that the degree of opening of the movable guide vanes of the lowest pressure stage becomes relatively larger or smaller than that of the stationary guide vanes in a high flow-rate range or in a low flow-rate range, respectively, while maintaining the degree of opening of the movable guide vanes of the lowest pressure stage to be equal to or smaller than that of the highest pressure stage.

2 Claims, 7 Drawing Figures

MULTISTAGE HYDRAULIC MACHINES AND METHODS OF CONTROLLING OPERATIONS THEREOF

BACKGROUND OF THE INVENTION

The present invention relates to a multistage hydraulic machine and a method of controlling operation thereof as a pump or turbine so as to improve hydraulic performance under a steady operating condition and stably operate the hydraulic machine by suppressing vibration and noise generated therein.

Generally, the operation or running condition of a hydraulic machine can be controlled by adjusting the amount of water passing through the hydraulic machine, this adjustment being done by guide vanes provided on the periphery of a runner or an inlet valve located at an inlet portion of the hydraulic machine. Regarding a multistage hydraulic machine in which respective pressure stages are provided with runners connected through return passages respectively, there have been proposed several methods for controlling water flow conditions at the respective stages by guide vanes located on the peripheries of runners of the stages, thereby controlling the operation of the conventional multistage hydraulic machine. However, with the multistage hydraulic machine of the type described above, it is extremely difficult, because of constructional limitations, to provide guide vanes on the outer peripheries of the runners of the corresponding stages and to control the operating or closing of the guide vanes by a guide vane control unit which is connected to the guide vanes, which provides a problem for practical use of the multistage hydraulic machine. Thus, in the multistage hydraulic machines of this kind, in many cases only stationary guide vanes having a constant degree of opening are located on an outer peripheral surface of a runner of each stage, and adjustment of the amount of water flow and control of the operation of the machine are performed by open-close control of an inlet valve provided at an inlet portion of the hydraulic machine. Moreover, in such multistage hydraulic machines, the water flow condition at the periphery of the runner of each stage cannot be properly adjusted in response to the amount of water flow passing therethrough, so that in low and high flow-rate ranges apart from design points, hydraulic performance decreases and the hydraulic machine is itself operated under lowered total hydraulic performance. In addition, water head loss at a portion near the inlet valve is increased by adjusting the amount of water passing through the inlet valve by partially closing the opening of the valve, and therefore, hydraulic energy corresponding to the water head loss is wasted and the running efficiency of an electric power plant is decressed.

In order to obviate defects or problems described above, there has also been proposed a method for controlling the operation of a multistage hydraulic machine, in which movable guide vanes are provided only for the highest pressure stage and the amount of water flow can be adjusted by regulating the degree of opening of these movable guide vanes. According to this operation control method, the water head loss at the inlet valve which is observed in a case where no movable guide vanes are arranged at the highest pressure stage was not observed, so that this control method has a better operation efficiency than the first mentioned method. However, regardless of such advantage as described above, in the later mentioned method, since the lowest pressure stage is operated at an operation point largely apart from a designed operating point during operation as a turbine with a small amount of water, water separation phenomenon and/or secondary local flow may often occur, and these adverse phenomena are often observed as water pressure on the outlet side of a runner lowers, so that there are problems such as an increase in water separation phenomenon and secondary local flow at the lowest pressure stage where the water pressure on the outlet side of the runner of this stage is lower than those of the other stages, and the hydraulic machine of this type is operated under an unstable condition with cavitation, strong vibrations and noises.

Consequently, as described hereinabove, a multistage hydraulic machine having pressure stages each provided with movable guide vanes whose degrees of openings can be adjusted is most preferred for hydraulic characteristics, but imposes severe restriction on the construction of a machine for practical use. A multistage hydraulic machine, in which respective pressure stages are provided with stationary guide vanes whose degrees of openings cannot be adjusted and water flow control is done only by adjusting an inlet valve, has the most simple structure, but has extremely less hydraulic characteristics. Moreover, a multistage hydraulic machine in which only the highest pressure stage is provided with movable guide vanes has been proposed, but cavitation, vibrations and noises were often generated when the machine was operated with a small amount of water.

SUMMARY OF THE INVENTION

An object of the present invention is to provide a multistage hydraulic machine and a method for controlling the operation thereof so as to stably operate it to obtain an improved hydraulic performance at a steady operation condition thereof and efficiently suppressing generation of cavitation, vibrations and noises in the hydraulic machine.

According to the present invention, there is provided an improved multistage hydraulic machine and a method of controlling a multistage hydraulic machine having at least three stages in which respective pressure stages are connected in series through runners and return passages and are provided with guide vanes disposed on the outer peripheries of respective runners. The method comprises the steps of varying the degree of opening of the movable guide vanes of the highest and lowest pressure stages in accordance with an operation condition of the hydraulic machine, maintaining the degree of opening of the stationary guide vanes of the other pressure stages at a constant value, controlling the degree of opening of the guide vanes of the lowest pressure stage such that they are larger than those of the intermediate pressure stages in a high flow-rate range, and smaller than those of the intermediate pressure stages in a low flow-rate range, while maintaining the degree of opening of the movable guide vanes of the lowest pressure stage to be equal to or smaller than that of the highest pressure stage, in accordance with a change in an operation condition of the hydraulic machine at a time of steady operation thereof.

DESCRIPTION OF THE PREFERRED EMBODIMENTS

Figure 1:
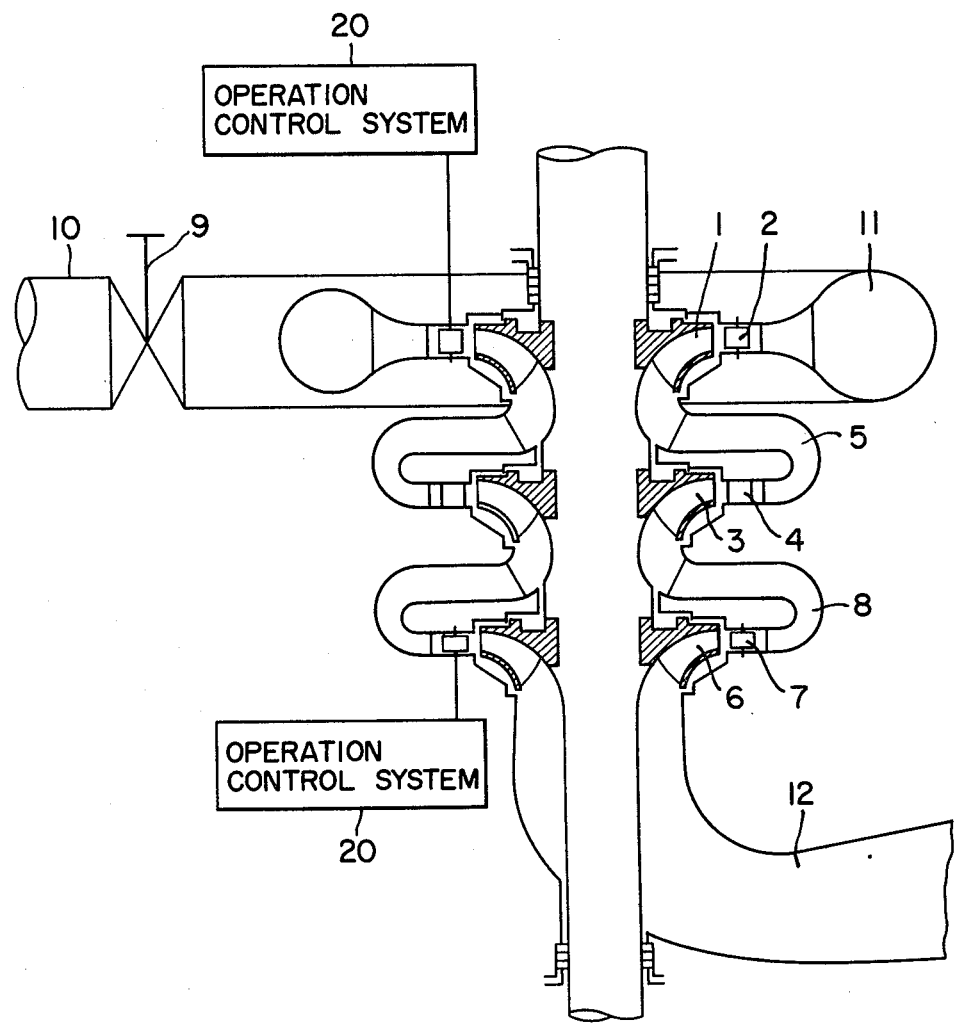
FIG. 1 is a schematic longitudinal sectional view of a typical three-stage hydraulic machine to which this invention is applicable.

The present invention will be described in detail hereunder in conjunction with FIG. 1 which shows an embodiment of a Francis-type three-stage hydraulic machine.

A runner 1 of the highest pressure stage is provided on its outer periphery with a plurality of movable guide vanes 2 which are arranged on a circle and whose degrees of openings can be varied. A runner 3 of an intermediate pressure stage is provided on its outer periphery with a plurality of stationary guide banes 4 which are arranged on a circle and whose degrees of openings are not varied, and the highest pressure stage and the intermediate pressure stage are connected in series with each other through a return passage 5. A runner 6 of the lowest pressure stage is provided on its outer periphery with a plurality of movable guide vanes 7 which are arranged on a circle and whose degree of opening can be varied, and the lowest pressure stage is connected in series with the intermediate pressure stage through a return passage 8.

With the multistage hydraulic machine of this type, when it operates as a turbine with an inlet valve 9 being opened, the water flow passing through a penstock 10 and a casing 11 connected thereto passes (in order) through the guide vanes 2 and the runner 1 of the highest pressure stage, the return passage 5, the guide vanes 4 and the runner 3 of the intermediate pressure stage, the return passage 8, the guide vanes 7 and the runner 6 of the lowest pressure stage. The water is then discharged through a draft tube 12 connected to a spillway, not shown. On the other hand, when the hydraulic machine is operated as a pump, the water passes from the draft tube 12 to the penstock 10 in an order reverse to that described above in connection with the operation as a turbine.

According to the present invention, the multistage (three-stage) hydraulic machine of the type described above is operated under a steady operating condition by controlling the degree of opening of the guide vanes of the respective pressure stages independently or simultaneously in a manner such that the degree of opening of the guide vanes of the lowest pressure stage are maintained to always be equal to or less than that of the highest pressure stage and such that the degree of opening of the movable guide vanes are relatively larger than those of the stationary guide vanes in a high flowrate range and relatively smaller than those of the stationary guide vanes in a low flowrate range.

The hydraulic characteristics of the respective stages of the three-stage hydraulic machine, which operates under a steady turbine operation condition and which can be controlled in accordance with the manner described above according to this invention, will be explained hereunder in conjunction with FIG. 2.

Figure 2:
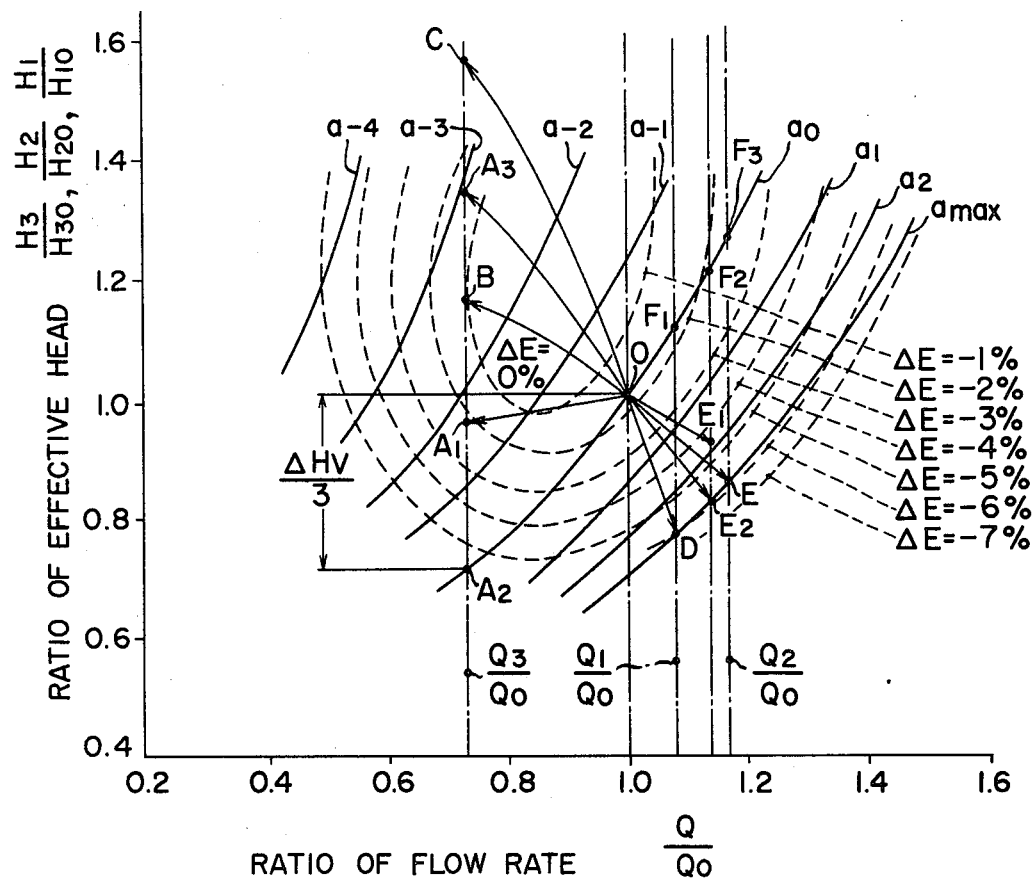
FIG. 2 shows a graph representing hydraulic characteristics when the hydraulic machine is operated as a turbine.

In FIG. 2, reference character $H_1$ represents an effective water head of the highest pressure stage, $H_2$ and $H_3$ are those of the intermediate pressure stage and the lowest pressure stage, respectively, Q is a flow amount, and $a_x$ (x: ..., $-2$, $-1$, 0, 1, 2, ...) designates the degree of opening of the guide vanes of the respective stages. Reference characters represented by characters (i.e., $H_1$, $H_2$, $H_3$, Q, and a) added with "0" represent values at the normal operating condition of the water wheel in which the respective stages are operated under a hydraulically equivalent operating condition. The normal operating condition is shown as a point "0" in FIG. 2. The degree of opening of the guide vanes are shown as $a_1$, $a_2$, $a_3$, ... when the guide vanes are opened to be larger than $a_0$ and are shown as $a_{-1}$, $a_{-2}$, $a_{-3}$, ... when the guide vanes are opened to be smaller than $a_0$. $\Delta E$ (%) designates the relative turbine efficiency difference represented by a relative difference from the maximun turbine efficiency.

FIG. 2 illustrates the relationship between the flow rate and the effective water head for each stage, in which the abscissa shows a ratio of flow rate $\theta/\theta_0$ and the ordinate shows ratios of effective water head $H_1/H_{10}$, $H_2/H_{20}$, and $H_3/H_{30}$ at respective stages. Accordingly, a combined total effective water head of the multistage hydraulic machine can be obtained by summing up the effective water heads for the respective stages.

Referring to FIG. 2, where the inlet valve is fully opened and each stage is in the normal operation condition (point 0 in FIG. 2), the effective head $H_1$, $H_2$, or $H_3$ of each stage is one-third of the total combined effective head $H_0$ that acts upon the hydraulic machine, and is represented by the following relationship (1):

$$\left.\begin{array}{l} H_1 + H_2 + H_3 = H_0 \\ H_1 = H_2 = H_3 \\ H_1 = H_{10} = H_0/3 \\ H_2 = H_{20} = H_0/3 \\ H_3 = H_{30} = H_0/3 \end{array}\right\} \quad (1)$$

When the flow rate is reduced from the level for the normal turbine operation (point 0), the operation loci, in a method in which only the opening degree of the inlet valve is regulated, in a method in which only the opening degree of the movable guide vanes of the highest pressure stage is regulated, and in a method according to the present invention, are comparatively shown in FIG. 2 and will be described hereunder in conjunction therewith.

First, in a case of the inlet valve control while constantly maintaining the degree of opening at the normal degree of opening $a_0$ at each stage, the effective head acting upon each stage decreases by one-third of the lost water head $\Delta H_v$ at the portion of the inlet valve. Accordingly, the operation point of each stage changes or shifts along a curve $0 \rightarrow A_2$ on the curve corresponding to the normal opening degree $a_0$ in FIG. 2, and the hydraulic machine is operated with extremely reduced hydraulic performance and low head at every stage according to the following relationship (2):

$$\left. \begin{array}{l} H_1 + H_2 + H_3 = H_0 - \Delta H_\nu \\ H_1 = H_2 = H_3 \\ H_1 = (H_0 - \Delta H_\nu)/3 = H_{10} - \Delta H_\nu/3 \\ H_2 = (H_0 - \Delta H_\nu)/3 = H_{20} - \Delta H_\nu/3 \\ H_3 = (H_0 - \Delta H_\nu)/3 = H_{30} - \Delta H_\nu/3 \end{array} \right\} \quad (2)$$

As can be understood from the above description, in a prior art multistage hydraulic machine which is controlled by regulating the flow rate by adjusting the degree of opening of the inlet valve only, hydraulic energy corresponding to the lost water head at the inlet valve is lost and the machine is operated at each stage with an extremely reduced hydraulic performance, which is uneconomical. In addition, since each stage of the hydraulic machine is operated at a point having a low head with the reduced hydraulic performance, the separation phenomenon of water flow and/or local secondary flow are caused, and particularly, at the highest pressure stage, the separation phenomenon and/or local secondary flow are generated in an increased manner for the reason that the hydraulic pressure on the outlet side of the runner of this stage is low, thereby adversely inducing whirl or cavitation causing strong vibrations and noises.

Secondly, let us consider the operation of the three-stage hydraulic machine in which the degree of opening of the movable guide vanes of only the highest pressure stage is variable and those of the other stages are not variable. Under these conditions, when the flow rate is reduced by controlling the movable guide vanes of the highest pressure stage so as to have a small degree of opening thereof in the normal turbine operating condition, the operating point at the highest pressure stage shifts along a curve 0→C and the operating points of the other stages shift along a locus 0→B according to the following relationship (3).

$$\left. \begin{array}{l} H_1 + H_2 + H_3 = H_0 \\ H_2 = H_3 = (H_0 - H_1)/2 \\ H_2 = H_3 < H_1 \end{array} \right\} \quad (3)$$

As can be understood from the above description, in a prior art multi (for example, three)-stage hydraulic machine in which the flow rate is controlled by adjusting the degree of opening of the movable guide vanes of the highest pressure stage, the hydraulic machine can operate more economically in comparison with the hydraulic machine described above because there is no loss of hydraulic energy due to loss of water head at the inlet valve. However, since the lowest pressure stage of the secondly mentioned hydraulic machine operates with reduced hydraulic performance, the whirl or cavitation resulting in strong vibrations and noises may be adversely caused at the outlet portion of the lowest pressure stage.

Referring to FIG. 2, finally, will be described hereunder the flow rate adjustment in a normal turbine operation of a multistage hydraulic machine of the present invention in which the highest and lowest pressure stages are provided with movable guide vanes, the degree of opening of which can be changed and the other pressure stages are provided with stationary guide vanes, the degree of opening of which cannot be changed.

With this multistage hydraulic machine, in a case where it is required to carry out load adjustment by reducing the flow rate from the normal turbine operation condition (point 0 in FIG. 2), according to the present invention, the movable guide vanes of the highest and lowest pressure stages are controlled so that the degree of opening of these guides vanes are relatively smaller than those of stationary guide vanes of the other intermediate pressure stage while the degree of opening degrees of the movable guide vanes of the lowest pressure stage are maintained to be always equal to or smaller than that of the highest pressure stage.

Figure 4:
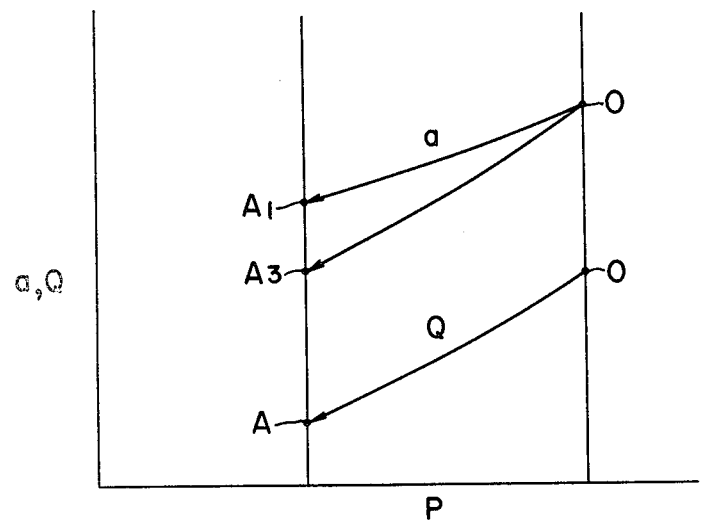
FIG. 4 shows a graph representing the relationship between an operation load and degrees of openings of guide vanes when the hydraulic machine is operated under a steady turbine operation.

FIG. 4 shows a graph of one embodiment representing a mode of the degree of opening of the movable guide vanes during the water wheel load adjustment in which the abscissa shows total turbine load P and the ordinate shows degree of opening $a$ of the movable guide vanes and turbine flow rate Q. According to the hydraulic machine and its controlling method of this invention, the movable guide vanes of the highest and lowest pressure stages can be relatively controlled in different degree of opening control modes. More particularly, in FIG. 4, where the flow rate Q is reduced along a characteristic curve 0→A thereby to control the total turbine load to a partial load, the degree of opening of the movable guide vanes of the highest and lowest pressure stages are controlled with respect to the total turbine load P along characteristic curves 0→A$_1$ and 0→A$_3$, respectively. Namely, with reference to FIG. 2, the highest, lowest, and intermediate pressure stages of the hydraulic machine of the present invention are operated along characteristic curves 0→A$_1$, 0→A$_3$, and 0→A$_2$, respectively. Thus, the lowest pressure stage, in which the hydraulic pressure at the outlet of the runner is low, is operated with a high head and excellent hydraulic performance. Therefore, the water flow at the outlet of the lowest pressure stage becomes stable so that unstable whirl or cavitation which causes noises and vibrations would not be generated, thus operating the machine safely and stably at the lowest pressure stage. Moreover, in this control mode, since only the intermediate pressure stages are operated with low hydraulic performance and low head, the total hydraulic performance in a turbine operating with a small amount of water flow can be improved when compared with the case in which only the highest pressure stage is provided with the movable guide vanes.

In another case even where installation and/or operating conditions of a hydraulic machine are originally favored, for example, where the hydraulic machine can be designed to have relatively large pumping head and the hydraulic pressure on the outlet side of the runner of the lowest pressure stage is relatively high, thereby to hardly generate the whirl and/or cavitation causing vibrations and noises, according to the multistage hydraulic machine of the present invention, when the machine operates as a turbine with a small amount of water flow, the highest and lowest pressure stages are operated for maintaining the degree of opening of water paths of the movable guide vanes to be equal to each other, and in addition, these degrees of opening are controlled to be smaller than those of the stationary guide vanes of the intermediate pressure stages. According to this controlling mode, the intermediate pressure stages are operated along a curve 0→A$_2$ (FIG. 2), but the highest and the lowest pressure stages are operated along a curve 0→B (FIG. 2) with a high head and high hydraulic performance whereby the total hydraulic characteristics can be improved as described before regarding the case where the movable guide vanes are controlled so that the degree of opening of the guide vanes of the lowest pressure stage is maintained to be smaller than those of the highest pressure stage. In this control mode, the operating point of the lowest pressure stage is slightly on the side of the low head as compared to the case where the degree of opening at the lowest pressure stage is maintained to be smaller than that at the highest pressure stage, but in comparison with the point $A_2$ in FIG. 2, which is the operating point of the lowest pressure stage of a conventional hydraulic machine, the hydraulic machine of the present invention can be operated on the side of high head. Thus, in the case where the pumping head is relatively high, the whirl and/or cavitation causing vibration and noise are hardly generated.

Thus, according to the present invention, the multistage hydraulic machine can operate with high performance and less vibration and noise under a small water amount turbine operation. The hydraulic machine can also be controlled so as to improve the hydraulic performance or reduce vibration and noise.

In a case where a total effective head acting on a hydraulic machine is preliminarily given, a conventional multistage hydraulic machine operated by the inlet valve control can operate in a range of a flow rate larger than the case of the normal turbine operation condition 0 where the inlet valve is fully opened as shown in FIG. 2. However, according to the operation control mode of the present invention, the hydraulic machine can operate in a range of a flow rate higher than the case of the operation condition 0 according to the following relationship (4) and can generate a large turbine output.

$$\left.\begin{array}{l} H_1 + H_2 + H_3 = H_0 \\ H_1 > H_2 \\ H_3 > H_2 \end{array}\right\} \quad (4)$$

Moreover, a hydraulic machine, in which movable guide vanes are provided for only the highest pressure stage, can be operated in a flow rate range larger than the case of the operation condition 0 by controlling the degree of opening of the movable guide vanes of the highest pressure stage so that the degrees of opening becomes larger than those of the stationary guide vanes of the other pressure stages. However, according to the present invention, the hydraulic machine can be operated in the higher flow-rate range than the case just described above.

Hereinbelow with reference to FIG. 2 the present invention will be described as a three-stage hydraulic machine as a typical example of a multistage hydraulic machine.

With the three-stage hydraulic machine operated by controlling the movable guide vanes of only the highest pressure stage, in a case where the guide vanes of the highest pressure stage are opened to the maximum extent $a_{max}$ from the normal turbine operation (point 0), the operating point is shifted along a curve 0→D and operating points at the other pressure stages are shifted along a curve 0→F$_1$. At the stage of $a_{max}$, the maximum flow amount passing through the hydraulic machine is represented by $Q_1$.

On the other hand, with the three-stage hydraulic machine according to the present invention, in a case where the movable guide vanes of the highest and lowest pressure stages are equally opened to the maximum extent of $a_{max}$, the operating points at these stages are shifted along a curve 0→E and the operating point at the intermediate pressure stage provided with stationary guide vanes is shifted along a curve 0→F$_2$. At the stage of $a_{max}$, the maximum flow amount passing through the hydraulic machine is represented by $Q_2$ which is larger than $Q_1$, thus obtaining a maximum output in the turbine operation larger than that obtained by the conventional controlling mode.

A point E in FIG. 2 represents an operation condition at which hydraulic performance is degraded under a low head, and wherein water separation phenomenon or a local secondary flow often occurs. Particularly, let us assume that at the lowest pressure stage having an outlet at which hydraulic pressure is low, whirl or cavitation causing vibration and noises occurs. However, in the present case, according to this invention, the guide vanes of the respective stages are controlled in a manner such that the degree of opening of the stationary guide vanes of the intermediate pressure stage is smaller than those of the movable guide vanes of the highest and lowest pressure stages while maintaining a relative relationship such that the degree of opening of the movable guide vanes of the lowest pressure stage is controlled to be smaller than that of the highest pressure stage. According to this control mode, with reference to FIG. 2, the highest, lowest and intermediate pressure stages operate along curves 0→E$_2$, 0→E$_1$ and 0→F$_3$, respectively, and therefore, the lowest pressure stage has a head higher than that in a case where the lowest pressure stage is operated with the degree of opening of the movable guide vanes maintained equal to that of the highest pressure stage, thereby suppressing the generation of the whirl or cavitation.

According to the multistage hydraulic machine and the operation control method thereof, as described hereinabove, in the steady turbine operation, the degree of opening of the movable guide vanes of the highest and lowest pressure stages are controlled to be relatively larger than those of the stationary guide vanes of the intermediate pressure stages in a high flow rate operation ranges or to be relatively smaller in a low flow rate operation range. In this control mode, although the respective pressure stages are simultaneously or independently controlled, in either one case, the degree of opening of the movable guide vanes of the lowest pressure stage is maintained to be equal to or relatively smaller than that of the highest pressure stage. Thus, the multistage hydraulic machine according to the present invention can be stably operated with greatly decreased vibrations and noises and improved hydraulic performance in the low flow rate range and with considerably greater maximum output in the high flow rate range.

Figure 5:
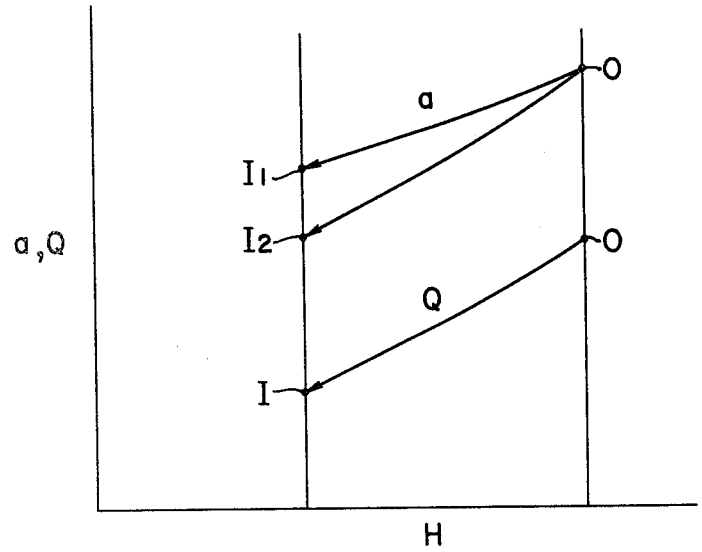
FIG. 5 shows a graph representing the relationship between an operation load and degree of opening of guide vanes when the hydraulic machine is operated under a steady turbine operation.
Figure 6:
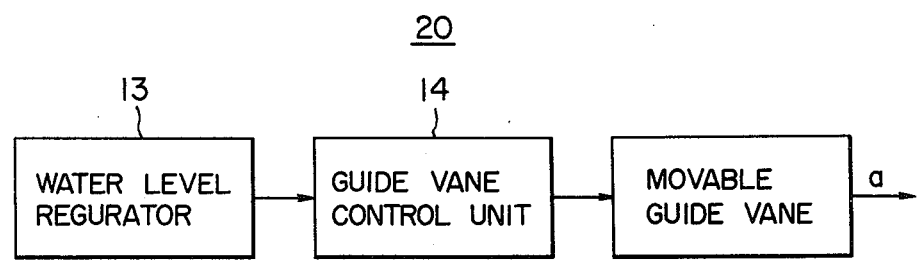
FIGS. 6 and 7 are block diagrams showing control systems for controlling guide vanes of the hydraulic machine when it operates under a steady operating condition.

In a controlling mode for the movable guide vanes of the highest and the lowest pressure stages in response to the change of water level, i.e. the change of the water head, in the steady turbine operation, according to the present invention, as shown in FIG. 5, the degree of opening of the movable guide vanes of the highest and lowest pressure stages can be controlled, respectively, by different controlling modes with respect to the water head. More specifically, as shown in FIG. 6, in a case where a load is adjusted and controlled so that the flow amount Q will reduce along a curve 0→I from the normal condition 0 in response to the change of the total effective head from the normal condition $H_0$ to a low head condition $H_m$, the respective pressure stages are controlled so that the degree of opening of the movable guide vanes of the highest and lowest pressure stages become smaller than those of the stationary guide vanes of the intermediate pressure stages, while the degree of opening of the movable guide vanes of the lowest pressure stage is always maintained to be smaller than that of the highest pressure stage.

Hereinbelow are described hydraulic characteristics of the multistage hydraulic machine in the steady pump operation, particularly a three-stage hydraulic machine, with reference to FIG. 3.

Figure 3:
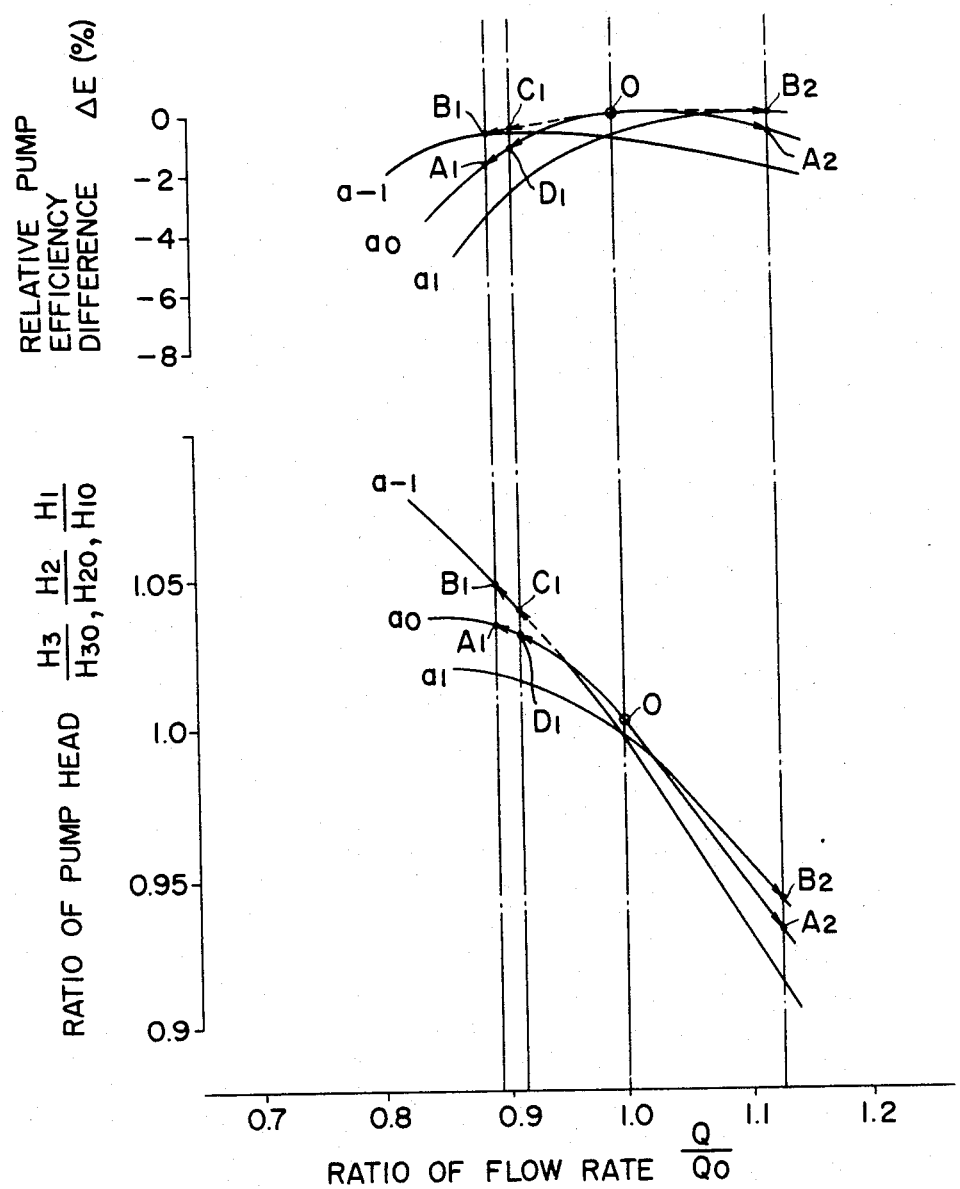
FIG. 3 shows a graph representing hydraulic characteristics when the hydraulic machine is operated as a pump.

Referring to FIG. 3, reference character $H_1$ designates a lift at the highest pressure stage, $H_2$ is a lift at the intermediate pressure stage, and $H_3$ is a lift at the lowest pressure stage. Reference character Q designates a flow amount and reference characters $H_{10}$, $H_{20}$, $H_{30}$ and $Q_0$, corresponding respectively to $H_1$, $H_2$, $H_3$ and Q, are lifts and flow amount at the normal pump operation condition (point 0 in FIG. 3) in which operations of respective pressure stages are hydraulically equivalent. Reference character $a_0$ designates the degree of opening of water path at each stage for the normal pump operation and $a_1$ is the degree of opening of water paths of the highest and lowest pressure stages larger than $a_0$. $a_{-1}$ designates degree of opening of water paths of the highest and lowest pressure stages smaller than $a_0$. $\Delta\eta$ designates the maximum turbine efficiency difference represented by a relative difference from the maximum turbine efficiency. The total lift of the multistage hydraulic machine is given by adding together respective lifts of the respective pressure stages corresponding to the flow amounts shown in FIG. 3. Referring to FIG. 3, the total lift $H_0$ generated at the normal pump operation (point 0) in which the inlet valve is fully opened and the respective stages are hydraulically equally operated according to the following relationship (5).

$$\left.\begin{array}{l} H_1 + H_2 + H_3 = H_0 \\ H_1 = H_0/3 = H_{10} \\ H_2 = H_0/3 = H_{20} \\ H_3 = H_0/3 = H_{30} \end{array}\right\} \quad (5)$$

Where the water level at a hydroelectric power plant rises over that at the normal operation, it is necessary for a hydraulic machine to operate as a pump under a head higher than the normal head $H_0$ in response to the rise of the water level. However, in such case, with a conventional multistage hydraulic machine, since the respective pressure stages are operated with the stationary standard openings $a_0$ of water paths and with the inlet valve fully opened, the operation of each stage shifts to a low flow rate range on the high lift side along a curve 0→$A_1$ with the relatively large degrees of openings $a_0$, and the respective pressure stages are operated with extremely degraded hydraulic performance thereby degrading the total hydraulic characteristics of the hydraulic machine. With a conventional hydraulic machine in which only the highest pressure stage is provided with movable guide vanes, the degree of opening of which can be adjustable and the other pressure stages are provided with stationary guide vanes having a constant degree of opening, the operation point of the highest pressure stage is shifted along a curve 0→$B_1$ with the most pertinent degree of opening of a water path, but the operation point of the lowest pressure stage having low hydraulic pressure on a pump inlet side of a runner is shifted to a point $A_1$ on a high lift side with the normal degree of opening $a_0$. Thus, noises and vibrations are likely to be caused by cavitation or local secondary flow on the lowest pressure side. In such case, according to the hydraulic machine of the present invention, the operation points of the intermediate pressure stages are shifted to the operation point $B_1$ on the high lift side with the degree of opening $a_0$ of the water path and the degree of opening of the movable guide vanes of the highest and lowest pressure stages are controlled to become smaller than $a_0$, so that the highest and lowest pressure stages are shifted to the high lift side along the most suitable curve 0→$C_1$ with the following relationship (6) thereby maintaining high hydraulic performance and greatly reducing the generation of cavitation or local secondary flow causing vibrations and noises.

$$\left.\begin{array}{l} H_1 + H_2 + H_3 = H_0 \\ H_1 = H_3 < H_2 \end{array}\right\} \quad (6)$$

Accordingly, with the multistage hydraulic machine of the present invention, in the low flow-rate range on the high turbine lift side, the hydraulic machine can be operated with improved hydraulic characteristics and less generation of cavitation or local secondary flow in comparison with a conventional hydrualic machine.

On the other hand, in a case where a water level at the power plant lowers below than that of the normal pump operation, it is necessary to operate the hydraulic machine with a lift lower than the normal lift correspondingly to the lowered water level. In such case, with the conventional hydraulic machine, it is operated at the respective stages with the stationary normal opening $a_0$ and the inlet valve fully opened and the operation conditions of the respective stages are shifted along a curve 0→$A_2$ to the high flow-rate range on the low lift side with the relatively small opening $a_0$ of the water path, so that the respective pressure stages operate with poor hydraulic performance and reduced total hydraulic characteristics. In the present case, with the hydraulic machine of this invention, the operation conditions of the intermediate pressure stages are shifted to the low lift side with the normal degree of opening $a_0$, but the operation conditions of the highest and lowest pressure stages are shifted to the low lift side along a curve 0→$B_2$ by controlling the degree of opening of these stages to be lower than $a_0$ thereby maintaining high hydraulic performance and improving the total hydraulic characteristics of the machine.

Accordingly, as described hereinabove, in a steady pump operation of the hydraulic machine according to the present invention, the hydraulic machine can be operated with greatly improved hydraulic characteristics in the low flow-rate range on the high lift side or in the high flow-rate range on the low lift side, respectively, by controlling the degree of opening of the movable guide vanes of the highest and lowest pressure stages to be relatively smaller or larger than the constant degree of opening of the intermediate pressure stages.

Figure 7:
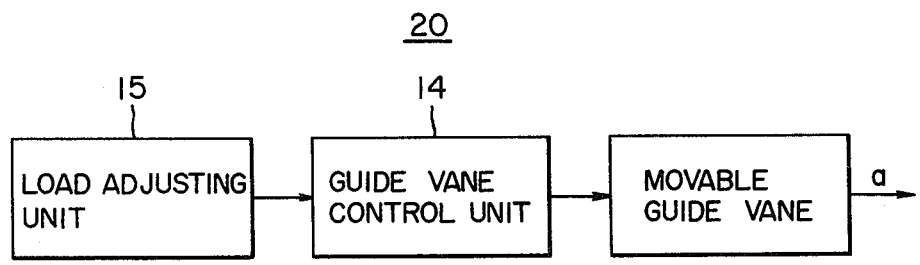

The controls of the movable guide vanes at the steady turbine operation and the steady pump operation can be easily performed under hydraulically stable conditions by an operation control system 20, which includes a water level regulator 13 and a guide vane control unit 14 to which movable guide vanes 2, 7 are connected as shown in FIG. 6, and by an operation control system 20, which includes a load adjusting unit 15 and the guide vane control unit 14 to which the movable guide vanes 2, 7 are connected, as shown in FIG. 7.

What is claimed is:

1. A multistage hydraulic machine comprising a multistage pump/turbine having at least three pressure stages connected in series by means of runners and return passages, said multistage pump/turbine including:
   a highest pressure stage having a first runner and a plurality of movable guide vanes arranged in a circle around said first runner;
   a first operation control means for varying opening of the movable guide vanes of the highest pressure stage;
   a lowest pressure stage having a second runner and a plurality of movable guide vanes arranged in a circle around said second runner;
   a second operation control means for varying opening of the movable guide vanes of the lowest pressure stage; and
   at least one intermediate pressure stage disposed between the highest pressure stage and the lowest pressure stage and having a runner and stationary guide vanes, said first and second operation control means controlling the degree of opening of the movable guide vanes of the highest pressure stage and the lowest pressure stage independently of each other when the multistage pump/turbine is being steadily operated as a turbine and simultaneously with each other when the multistage pump/turbine is being steadily operated as a pump.

2. A method of controlling a multistage hydraulic machine having at least three pressure stages comprising a highest pressure stage, a lowest pressure stage, and at least one intermediate pressure stage, and in which respective pressure stages are connected in series by means of runners and return passages and are provided with guide vanes disposed on the outer peripheries of respective runners, the guide vanes disposed on the outer peripheries of the highest pressure stage and the lowest pressure stage being movable and the guide vanes disposed on the outer periphery of the at least one intermediate stage being stationary, said method comprising the steps of:
   varying the degree of opening of the movable guide vanes of the highest pressure stage and the lowest pressure stage in accordance with an operation condition of said hydraulic machine;
   maintaining the degree of opening of the stationary guide vanes of the intermediate pressure stage at a constant value;
   independently controlling the degree of opening of the movable guide vanes of the highest pressure stage and the lowest pressure stage when said hydraulic machine is steadily operating as a turbine, while maintaining the degree of opening of the movable guide vanes of the lowest pressure stage so as to be equal to or less than the degree of opening of the movable guide vanes of the highest pressure stage, in a manner such that the degree of opening of the movable guide vanes of the highest pressure stage and the lowest pressure is greater than the degree of opening of the stationary guide vanes of the intermediate pressure stage in a high flow-rate range and less than the degree of opening of the stationary guide vanes of the intermediate pressure stage in a low flow-rate range; and
   simultaneously controlling the degree of opening of the movable guide vanes of the highest pressure stage and the lowest pressure stage when said hydraulic machine is being steadily operated as a pump, in a manner such that the degree of opening of the movable guide vanes of the highest pressure stage and the lowest pressure stage is greater than the degree of opening of the stationary guide vanes of the intermediate pressure stage in a high flow-rate range and less than the degree of opening of the stationary guide vanes of the intermediate pressure stage in a low flow-rate range.

* * * * *

UNITED STATES PATENT AND TRADEMARK OFFICE
CERTIFICATE OF CORRECTION

PATENT NO. : 4,472,103

DATED : September 18, 1984

INVENTOR(S) : Yamagata et al.

It is certified that error appears in the above-identified patent and that said Letters Patent is hereby corrected as shown below:

On the title page the following should be inserted:

-- /30/ Foreign Application Priority Data

June 22, 1981 /JP/ Japan............56-96302--.

Signed and Sealed this

Fifth Day of March 1985

[SEAL]

Attest:

DONALD J. QUIGG

Attesting Officer     Acting Commissioner of Patents and Trademarks